June 30, 1964 H. R. RECTOR 3,139,225
BOW AND MACHINE FOR MAKING IT
Filed May 1, 1961 3 Sheets-Sheet 1

INVENTOR.
HARLEY R. RECTOR
BY
Moore, White & Burd
ATTORNEYS

June 30, 1964 H. R. RECTOR 3,139,225
BOW AND MACHINE FOR MAKING IT
Filed May 1, 1961 3 Sheets-Sheet 2

INVENTOR.
HARLEY R. RECTOR
BY Moore, White & Burd
ATTORNEYS

June 30, 1964 H. R. RECTOR 3,139,225
BOW AND MACHINE FOR MAKING IT
Filed May 1, 1961 3 Sheets-Sheet 3

INVENTOR.
HARLEY R. RECTOR
BY
Moore, White & Burd
ATTORNEYS

United States Patent Office 3,139,225
Patented June 30, 1964

3,139,225
BOW AND MACHINE FOR MAKING IT
Harley R. Rector, 700 E. Clearview Drive,
Des Moines, Iowa
Filed May 1, 1961, Ser. No. 106,628
7 Claims. (Cl. 223—46)

This invention is a novel bow and machine for making it. The bows are formed by making figure 8 configurations layer upon layer with ribbon, portions of which are formed into cone-like shapes at the ends of the figure 8 and having the intermediate portions lying flat. The intermediate portions are then secured in any suitable manner as by stapling and the cones disengaged from each other to be supported in a semi-circular bow-like configuration, each cone-like portion, except the bottom ones, being supported by a cone-like portion below it.

The machine for making these bows is novel in having the ribbon cone forming portions of the machine supported in a manner allowing them to yield to permit the bows to be slipped off after they have been formed and secured. The machine is also novel in having a holder means for a prepared stick pad that is secured to the bow as the bow itself is secured, to provide a ready means for attaching the bow to an object to be decorated. The machine is also novel in having means for adjusting the distance between the cone forming portions of the machine, whereby bows of various sizes may be made with the same machine. A further novel feature of the machine structure is a bow positioning structure arranged at right angles to the bow forming portions of the machine; whereby a bow previously formed and a bow actually being formed on the machine may be secured at right angles to each other and fastened together securely to form a star bow.

Heretofore, bow making machines intended for use by stores and other commercial establishments in making gift wrappings, have been relatively expensive. The least expensive units known have been considerably in excess of ten dollars, which while not a large amount, is apparently a deterrent to small shops which might otherwise be interested in having a machine for making professional looking bows. Furthermore, many of the prior machines are relatively complex structures which malfunction due to disarrangement or wear of parts. Still another drawback of many of the commercial machines that have been offered to the market in the past consists in having rather limited means for attaching the units to packages. Furthermore, most of the bow making machines are rather limited in the variety in styles of bows that can be made on them. For all of these reasons, bow machines previously on the market have been something less than entirely satisfactory for all purposes. Accordingly, it is a main object of this invention to provide a novel bow making machine.

A further object of this invention is to make a bow making machine from which bows that have been formed and secured may be readily removed.

Still another object of this machine is to provide a bow making machine which is quite versatile in the type of bow securing means that may be attached to the bow after it is formed and while it is being secured.

It is a still further object of this invention to provide a bow making machine that will align two figure 8 type bows at right angles to each other to form a star bow.

It is a still further object of this invention to provide a bow making machine that quickly and easily secures the bows in their finished condition after they are formed.

Yet another object of this invention is to provide a bow making machine which can be adjusted to make bows of various sizes easily and accurately.

A still further object of this invention is to provide a bow making machine which provides a ribbon forming and holding structure on opposite sides of a staple bending anvil and incorporates a staple driving head hinged to the base so as to engage accurately the anvil whereby bows once made can be accurately and quickly secured by means of stapling.

It is yet another object of this invention to provide a bow forming and securing machine in which a pair of bow shaping devices having at least portions thereof conically shaped are so positioned that the cones formed in the ribbon, as it is wound on the bow shaping devices, has one portion thereof lying in substantially the same plane as a portion of the base on which an anvil is formed, whereby each layer of ribbon, as it is wound, lies flat across the anvil as the ribbon extends between the two bow forming devices.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which.

Figure 14:
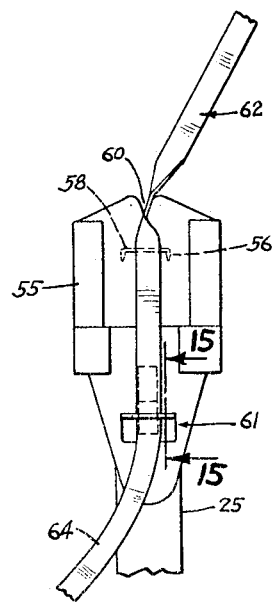
Figure 15:
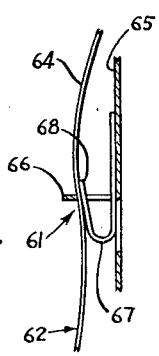

FIGURE 14 is a bottom view of the outer end of the stapler driving head showing in more detail the means for holding devices that are secured to the bows for attaching them to an item to be decorated. It is drawn to the same scale as FIGURE 4, with broken lines illustrating hidden parts; and FIGURE 15 is a fragmentary longitudinal section taken on the line 15—15 of FIGURE 14, and drawn to a substantially larger scale than FIGURE 14.

Figure 1:
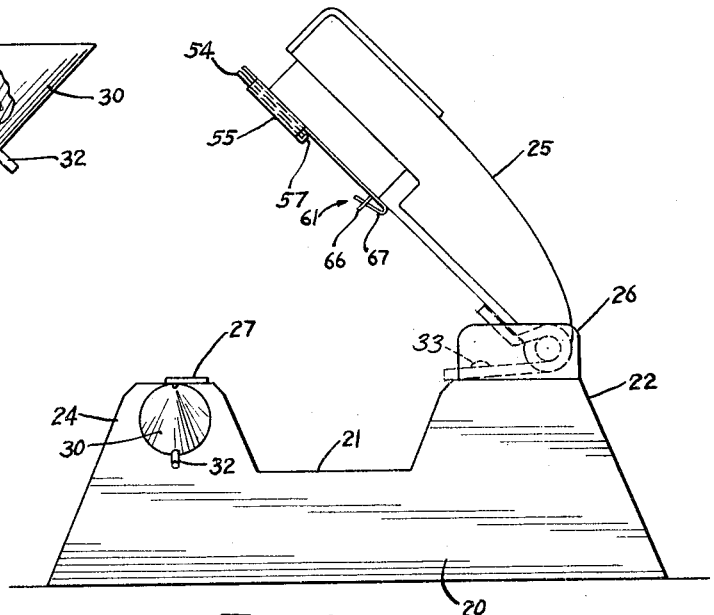
FIGURE 1 is a side elevation of the invention with broken lines illustrating hidden parts.
Figure 3:
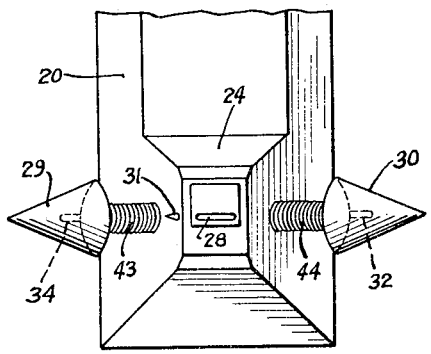
FIGURE 3 is a fragmentary plan view of the bow forming portion of the device and stapling anvil; broken lines illustrating hidden parts.

Referring to FIGURE 1 first, the machine of this invention is seen supported by a base member 20 having the cutaway throat portion 21 in its approximate longitudinal center with a staple driving head supporting pylon 22 at one end thereof and an anvil supporting pylon 24 at the other end of the throat 21. A conventional stapler 25, insofar as its staple driving mechanism is concerned, is seen pivoted to a channel or saddle member 26 that is rigidly secured to pylon 22. Plate 27 that is secured to pylon 24 appropriately carries the staple anvil 28 as seen in FIGURE 3. This anvil 28 is appropriately positioned with respect to the hinge point of saddle 26 so that stapler head 25 presents staples in precise alignment with the anvil 28.

Also secured to pylon 24 are the ribbon forming elements 29 and 30. The ribbon forming elements 29 and 30 are of any suitable shape and here they are shown illustratively as cones to form a particularly attractive bow having the end loops thereof formed in the shape of cone-like loops of ribbon. Immediately adjacent the anvil is some means of holding the end of a piece of ribbon in order to permit winding a bow, and the holding means is here shown as the spur or needle 31. Each of the ribbon forming elements 29 and 30 is provided with a stop near its lower base which keeps the ribbon from sliding off. These stops are designated 32 and 34 for the ribbon forming structures 30 and 29 respectively.

Figure 5:
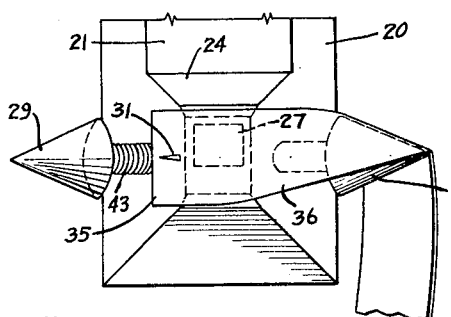
FIGURE 5 is a fragmentary plan view similar to FIGURE 3 but with the beginnings of the bow shown formed thereon; broken lines illustrate hidden parts.
Figure 6:
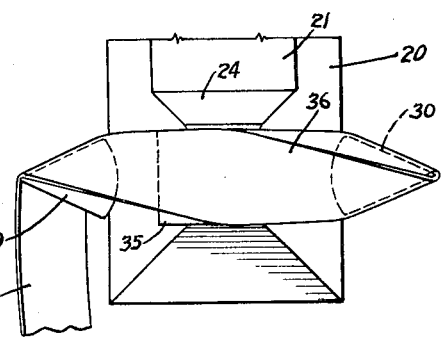
FIGURE 6 is a view similar to FIGURE 5 but with one additional step having been taken in winding the bow.
Figure 7:
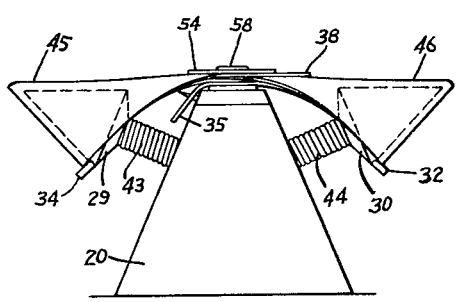
FIGURE 7 is a fragmentary front elevational view similar to the lower portion of FIGURE 2 with a completed bow wound thereon.
Figure 8:
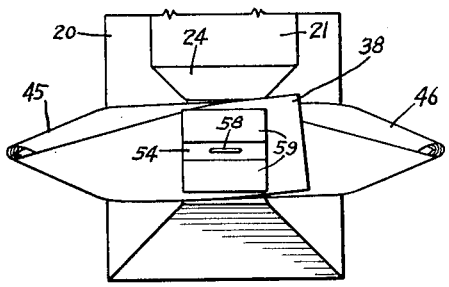
FIGURE 8 is a plan view of the material shown in FIGURE 7.

As shown in FIGURES 5 and 6, the bow is formed on the ribbon forming elements by first securing the end 35 of ribbon 36 on the spur or needle 31. Ribbon 36 is then extended across the anvil 28 to engage the far side of ribbon forming cone 30. The ribbon is wound around the ribbon forming structure and comes forward toward the front of the machine from the underside thereof and then arches back up and across the anvil again as shown in FIGURE 6. The free end 37 of ribbon 36 is then passed back across anvil plate 27 and around ribbon form 30 as described with respect to FIGURE 5. Thus, the ribbon forms a figure 8 around the two ribbon forming units and this formation of the ribbon is repeated until as many loops are formed on each ribbon cone forming structure as are considered desirable. A small amount of experimentation will indicate the number of loops of ribbon that can be used advantageously with any particular width of ribbon and spread between the ribbon forming elements 29 and 30. When the ribbon has been completely wound to the desired number of figure 8 formations as shown in FIGURES 7 and 8, the ribbon is held taut across the anvil with one hand while the other hand brings stapler head 25 down smartly to drive a staple through the ribbon portions lying across the anvil plate 27 thereby extending a staple through all the layers of ribbon lying across the anvil plate and clinching the staple on the staple anvil 28. After the bow has been secured, the ribbon may be severed as indicated at 38 and the completed basic bow structure is then removed from the machine.

Figure 4:
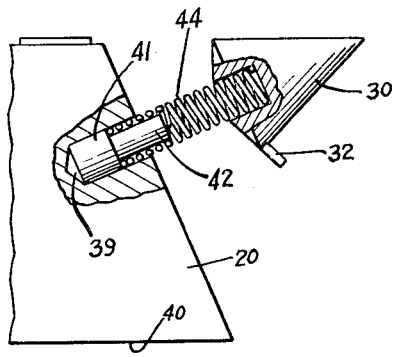
FIGURE 4 is a fragmentary front elevation of the structure shown in FIGURE 1 and drawn to a substantially larger scale than that figure; portions of the structure are broken away to show internal construction.
Figure 9:
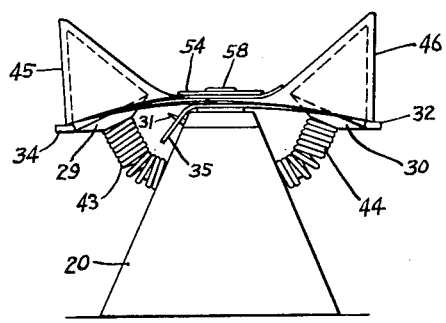
FIGURE 9 is an end elevation similar to FIGURE 7 but with the bow cone forming units in an adjusted position permitting removal of the bow.

This removal of the bow from the machine is illustrated clearly in FIGURE 9. There it will be seen that the bow forming members are yieldingly secured to pylon 24 whereby force applied to the bow cone forming structures will cause them to yield so as to reduce the spread between their outer ends to allow the finished bow to be slipped off the forming members 29 and 30. There are many possible ways to yieldingly support the ribbon forming structures on pylon 24 and a very simple and therefore satisfactory structure is illustrated in FIGURE 4. In that figure, it will be seen that pylon 24 is provided with a well 39 that slants with respect to the horizontal, downward from the outside of the pylon toward its center.

There are probably numerous angles that would be satisfactory and a very satisfactory one has been found to be about 22 degrees, with respect to a horizontal plane such as the bottom 40 of base 20. Well 39 receives a plug 41 which has a larger portion that snugly fits the well 39. A reduced portion 42 of plug 41 fits inside of a coil spring 44 to which the ribbon forming element 30 is tightly secured. As the plug portion 42 is shorter than the entire length of the spring, there is a portion of spring 44 that is left free to yield as shown in FIGURE 9 where the ribbon forming unit 30 is bent upward. The spring 44 is yielding to allow the cone forming portion 30 to yield upward so that the ribbon can be removed therefrom. Ribbon forming element 29 is provided with a similar supporting stem 43.

Figure 10:
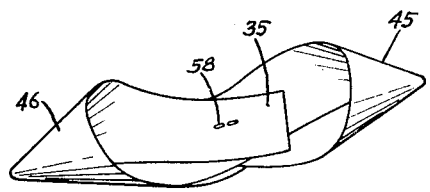
FIGURE 10 is a perspective view of a completed bow formed before the cones have been disassociated from each other.
Figure 13:
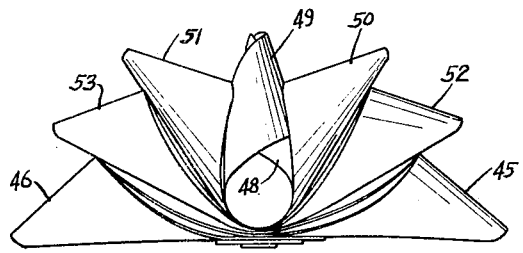
FIGURE 13 is a side elevation of the unit shown in FIGURE 12 with all of the various cone portions separated with upper ones being supported by lower ones.

When a bow has been removed from a machine and turned over, it appears as shown in FIGURE 10. At each end of the bow are several plies of cone-like formations designated 45 and 46 which may be separated one from the other by simply reaching inside the cone with a finger and bending the ribbon until the point 47 of an inside cone member 48 is separated from the group 45 for example. When the cones of the various laminations of the ribbon 36 are separated, a bow as seen in FIGURE 13 is made. The balance of the points of the bows have been numbered 49–53 respectively.

Referring now again to FIGURE 8, there will be seen on what turns out to be the bottom of the finished bow but the top of the bow formation as it is on the machine, a stick pad element 54 which is a prepared unit having pressure sensitive adhesive covered by peel-off sheets 59. This is a standard commercial item and not part of this invention.

Figure 2:
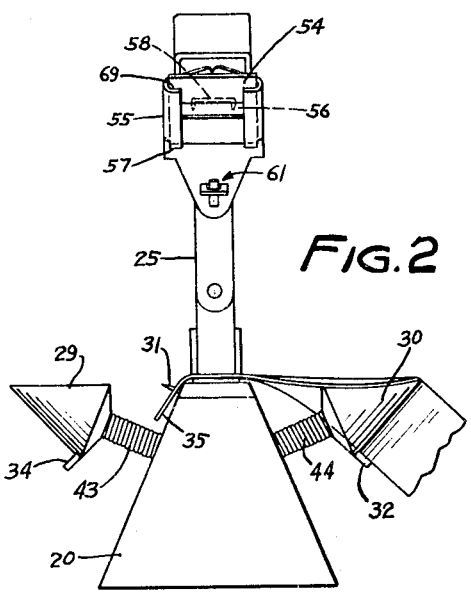
FIGURE 2 is a front elevation of the device shown in FIGURE 1; broken lines show hidden parts.

Referring now to FIGURES 1, 2 and 14, there will be seen a stick pad holding structure 55 which is secured to the stapler below the stapler driving mechanism and with an appropriate opening 56 therein through which the staple is driven. In order to fasten a stick pad to a bow with the same staple that secures the bow, the stick pad 54 is simply dropped into the stick pad holder 55 until it engages the stop member 57 which positions the stick pad with the staple receiving opening 56 approximately at the center of pad 54. When the bow is completed as shown in FIGURES 7 and 8 and the end of the ribbon is held taut across the anvil, the stapler may then be brought down in the usual manner to drive the staple through both the stick pad and the ribbon forming the bow at the same instant.

Referring again briefly to the stick pad holding structure 55 as shown in FIGURES 1, 2 and 14, it will be noted that there are narrow channels as at 69 formed on both sides of the unit. These channels receive the edges of the stick pad 54. After a staple has been driven through the stick pad and the bow formed on the machine, the stick pad, which is a heavy paper or light cardboard, bends as the stapler head 25 is withdrawn. The ends of the stick pad simply slip out of the channels 69. The stick pad is thus automatically left with the bow while the stapler is retracted upward to a substantial height conventionally as by spring 23.

In FIGURE 8 the staple appears at 58 and in FIGURE 10 the ends of staple 58 are seen in the center of the bow after they have been clinched by the staple bending anvil 28. The stop 57 may be any suitable structure such as a small tongue formed out of the metal from which the stick pad holder is formed.

When it is desired to secure a completed bow such as that shown in FIGURE 13 to any item desired to be decorated, such as a package or the like, the coverings 59 of the pressure sensitive adhesive on the stick pad 54 are removed, and the bow simply pressed against package or other item wherever it is desired to secure the bow.

On some occasions it may be desirable to provide a finished bow with a tie ribbon instead of using stick pad 54. The stick pad clamp is provided with a V-cut as at 60 which cooperates with a spring clip structure 61 to hold a tie ribbon 62 directly across the channel 56 through which the staple is driven. When the stapler is pulled down to drive a staple through a bow therefore, the ribbon 62 is secured to the bow simultaneously therewith. After the ribbon has been secured to the bow and the bow removed from the machine as shown in FIGURE 9, ribbon 62 may be pulled through the spring clip 61 to the length desired and then severed at a point between the channel 56 and spring clip 61 whereby the bow will be provided with a short tie ribbon and the end 64 of the ribbon 62 coming from a supply spool conveniently mounted near the machine will be retained at the machine so that it need not be threaded through spring clip 61 each time it is desired to measure off a length of ribbon as at 62.

Spring clip 61 may be of any various forms, and it is here shown as a piece of sheet metal 65 from which a pierced ear 66 is bent up. A spring 67 is arranged to have its end 68 extend through the opening in pierced ear 66 and lightly bear against the inside upper portion of ear 66. Ribbon 62, therefore, will be held lightly between the spring 68 and the inside top of pierced ear 66. This is sufficient to hold the ribbon from simply falling away from the machine when it is severed from a bow to which a portion of it has been secured. It is, at the same time, a weak enough grip so that when a tie ribbon is next desired to be secured to a bow, the end 64 of ribbon 62 as shown in FIGURE 15 is simply grasped and pulled through a spring clip until sufficient of the ribbon 64 extends beyond the V-clamp 60 in stick pad holder 55 to provide sufficient tie ribbon to secure the finished bow as desired. Ribbon 62 is held in V-clamp 60 by simply being wedged therein with an upward pull at the end of the tie ribbon 62. V-clamp 60 and spring clip 61 may also be used with string.

Still a third means of securing a finished bow to a package would be to lay a portion of ribbon comparable to that from which the bow is formed across anvil 28 at the same time that a staple is driven to secure a bow in finished formation. This ribbon is then secured tightly to the bow and used to secure the paper around a gift package, for example. As the bow is tightly secured by the staple to the ribbon used to secure the paper around the package, the bow also will be secured to the package in decorative manner. Obviously this bow machine provides versatile techniques for securing the finished bows to packages or other objects desired to be decorated with the bows.

It will be noted as shown in FIGURE 1, that the stapler is lifted up to such a height that the staple driving portion is entirely free of a vertical projection of that portion of the machine on which the bow is formed. This keeps the stapler up out of the way so that the ribbon may be quickly and easily wound on the ribbon forming elements 29 and 30. This high lift of the stapler is provided by any suitable spring structure as at 33 but is novel in the stapling field as staplers ordinarily are sprung only to give enough clearance above the anvil to admit flat papers, etc., to be stapled.

While the basic bow is a unit similar to the one shown in FIGURE 13, it lacks the cones 48 and 49, so that there would simply be the cone points 45, 46, 50, 51, 52 and 53. Without cone points 48 and 49 in the center, however, the two cone points 50 and 51 will be forced almost into engagement with each other and thereby substantially obscuring staple 58 which would be down in the center of the bow. Except when one is actually searching for it, therefore, the staple is substantially hidden.

In order to make the bow machine more versatile than simply making a single size of bow, an adjustment of the distance between the two bow forming elements 29 and 30 may be provided. Plug 41 is removable along with the bow forming unit 30 and spring 44. A twisting outward pulling motion removes the plug and the spring from well 39. If it is desired to make a larger bow, a plug having a longer enlarged portion is substituted in place of plug 41 and the entire unit replaced in well 39. The plug portion 42 would remain substantially the same length as for plug 41 shown in FIGURE 4. If it is desired to make a smaller bow, a plug having a shorter enlarged portion is used in place of plug 41. In this manner, by relatively simple means, the machine may be easily adapted to make all the basic sizes of bow which are those most commonly used in wrapping packages. While the plugs will be easily distinguished by a difference in size, they may also be color coded to assure that one does not make a lop-sided bow by using a longer plug with a shorter one.

Figure 11:
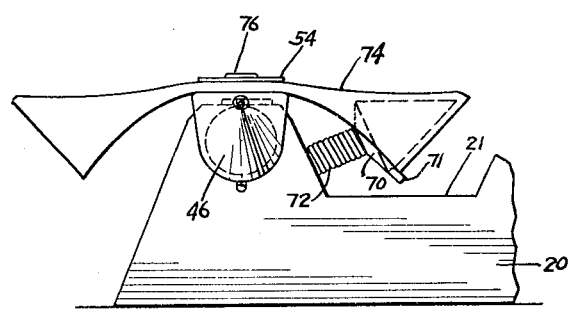
FIGURE 11 is a fragmentary side elevation of the machine showing how two of the units illustrated in FIGURE 10 may be secured together to provide a star bow formation.
Figure 12:
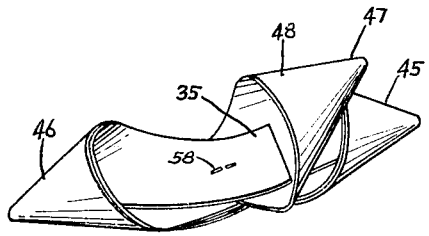
FIGURE 12 is similar to FIGURE 10 except that one of the cones at one end has been disassociated from the others.

It is also possible to make more elaborate bows using this structure, as for example, as illustrated in its early stages in FIGURE 11. In the throat 21 of the stapler base 20, is mounted a bow locating element 70. It is provided with a stop comparable to those on the bow forming members and is mounted on a stem 72 which may be yielding as in the case of springs 43 and 44 for bow forming elements 29 and 30 respectively. At 74 is shown a bow formation such as that shown in FIGURE 10 formed with three loops on each end. This bow will eventually look similar to the unit shown in FIGURE 13 but without the two center cones 48 and 49. On the ribbon forming means 30 is shown a unit which will eventually become a bow such as that illustrated in FIGURE 13. The bow formation 74 has been previously made and removed from the machine prior to forming the structure of the bow 75 shown on the machine on the cone forming element 30 in FIGURE 11. With the completion of bow 75, the end of the ribbon is pulled across the anvil and held while the previously formed bow 74 is fitted on the bow aligning means 70, which is at exactly right angles to a line drawn between the bow forming units 29 and 30. The two bows 74 and 75 are therefore held at right angles to each other precisely, as it is desired to have them secured. The stapler is then brought down as previously described, and a staple 76 is driven through both bows 74 and 75 and perhaps a stick pad for this bow also. The end formation, then, would be a bow such as that shown in FIGURE 13 secured on top of and at right angles to a bow similar to the one shown in FIGURE 13, but having only the three outer cones on either side of the center. The cones on either side of the center of the six loop bow yield to accept the bow such as that shown in FIGURE 13 extending across it. The total effect is one of a four pointed star.

All of the bow cone forming structures may be truncated which would make it easier to remove bows therefrom. On the other hand, it is preferred to have them complete cones as shown herein, as the machine itself has a better appearance with the complete cones, and it is also assured that the ribbon will be formed in the cone-like structures as the loops are formed in it.

While many of the principals employed in this bow forming device might be used in conjunction with bows having shapes other than those here disclosed, it is thought this conifer or cone bow is a particularly attractive one and believed novel in itself.

There are a number of ways that this bow might be described, and perhaps one of the most graphic is that it is formed of a plurality of plies of ribbon wound in figure 8 shape with the loops thereof formed into cones or cone-like portions connected by intermediate flat portions. When the bow is erected by disengaging upper plies from lower plies of the figure 8 formation, the upper cones are supported and forced toward the center of the bow by the lower cone plies. Many variations can be produced in these bows by securing contrasting colors of bows together as shown in FIGURE 11, or by turning some of the cones inside out, particularly when using what is known as two-color ribbon, that is, one color on one surface and a contrasting color on another surface.

Likewise, a totally different appearance to the bow as it is placed on a package might achieved by laying the stick pad or other securing means across the anvil before the bow is formed so that the cones point up in a reverse manner from that shown in FIGURE 13, as the unit is secured for purposes of decorating a package.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A bow machine comprising: a base, a pair of ribbon forming elements yieldingly secured to said base, means secured to said base intermediate of said ribbon forming elements adapted to hold the end of a piece of ribbon, and a fastener applying means movably secured to said base and movable into a position between said ribbon forming elements for fastening portions of ribbon intermediate said ribbon forming elements together while the ribbon is held on said ribbon forming elements.

2. The bow machine of claim 1 in which said pair of ribbon forming elements are yieldingly and removably secured to members that in turn are removably secured to said base; whereby said ribbon forming elements may be supported nearer to and farther from said base selectively.

3. The bow machine of claim 1 in which bow positioning means is secured to said base and extends horizontally at right angles to a line drawn between said ribbon forming elements.

4. A bow machine comprising: a base, said base having a pair of openings formed at one end extending into the base at an acute angle relative to the horizontal, a pair of plugs adapted to frictionally engage and be retained in the openings of said base, a pair of resilient members removably secured to said plugs, and a pair of ribbon forming elements secured to said resilient elements, said ribbon forming elements when supported by said resilient members, plugs and base being aligned transversely to said base.

5. A bow machine comprising: a base, said base having a pair of openings formed at one end extending into the base at an acute angle relative to the horizontal, a pair of plugs adapted to frictionally engage and be retained in the openings of said base, a pair of resilient members removably secured to said plugs, and a pair of conical ribbon forming elements secured to said resilient elements, said ribbon forming elements when secured to said base by means of said plugs and resilient elements being aligned transversely of said base, a staple bending anvil formed on said base intermediately of said ribbon forming members when secured thereto and approximately in a plane with the highest portions thereof, ribbon end holding means secured to said base adjacent to said staple bending anvil, a staple driving head hingedly secured to said base to be hingedly moved into stapling alignment with said staple bending anvil.

6. The bow machine of claim 5 in which said staple driving head includes a staple driving channel and there are means on either side of said staple driving head for holding a piece of tie ribbon with an intermediate portion thereof lying across the staple driving channel of said staple driving head.

7. The structure of claim 1 in which at least one of said ribbon forming elements is resiliently secured to said base in ribbon forming position to allow movement thereof in a direction as to permit a fastened bow to be removed from said ribbon forming elements.

References Cited in the file of this patent

UNITED STATES PATENTS

| | | |
|---|---|---|
| 2,351,557 | Swett et al. | June 13, 1944 |
| 2,481,451 | Shafer | Sept. 6, 1949 |
| 2,542,222 | Welch | Feb. 20, 1951 |
| 2,681,525 | James | June 22, 1954 |
| 2,686,307 | Franklin | Aug. 17, 1954 |
| 2,841,905 | Wanchek | July 8, 1958 |
| 2,933,223 | Kravig et al. | Apr. 19, 1960 |
| 2,982,452 | Anderson | May 2, 1961 |